United States Patent
Ichikawa

(10) Patent No.: US 11,427,107 B2
(45) Date of Patent: Aug. 30, 2022

(54) VEHICLE AND VEHICLE CONTROL METHOD

(71) Applicant: Toyota Jidosha Kabushiki Kaisha, Toyota (JP)

(72) Inventor: Shinji Ichikawa, Toyota (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 0 days.

(21) Appl. No.: 17/109,806

(22) Filed: Dec. 2, 2020

(65) Prior Publication Data

US 2021/0170911 A1 Jun. 10, 2021

(30) Foreign Application Priority Data

Dec. 4, 2019 (JP) .............................. JP2019-219550

(51) Int. Cl.
| | |
|---|---|
| *B60L 58/31* | (2019.01) |
| *H01M 8/04858* | (2016.01) |
| *B60K 11/06* | (2006.01) |
| *H01M 8/04537* | (2016.01) |

(52) U.S. Cl.
CPC .............. *B60L 58/31* (2019.02); *B60K 11/06* (2013.01); *H01M 8/0488* (2013.01); *H01M 8/04559* (2013.01); *B60L 2210/12* (2013.01); *H01M 2250/20* (2013.01)

(58) Field of Classification Search
CPC .............. B60L 58/31; B60L 2210/12; B60L 50/10–50; B60L 53/20; B60K 11/06; H01M 8/04559; H01M 8/0488; H01M 2250/20

USPC ................................................. 307/9.1, 10.1
See application file for complete search history.

(56) References Cited

U.S. PATENT DOCUMENTS

| | | | |
|---|---|---|---|
| 2012/0115057 A1 | 5/2012 | Yoshida | |
| 2013/0020863 A1* | 1/2013 | Sugiyama | B60L 58/20 320/134 |
| 2019/0366861 A1* | 12/2019 | Satake | B60L 58/20 |
| 2020/0023795 A1* | 1/2020 | Hirashima | B60L 58/10 |

FOREIGN PATENT DOCUMENTS

| | | |
|---|---|---|
| JP | 2019165529 A | 9/2019 |
| WO | 2011004493 A1 | 1/2011 |

* cited by examiner

*Primary Examiner* — Rexford N Barnie
*Assistant Examiner* — Swarna N Chowdhuri
(74) *Attorney, Agent, or Firm* — Dinsmore & Shohl LLP

(57) ABSTRACT

A vehicle includes: a PCU cooling system; a PCU that is cooled by the PCU cooling system; a buck converter; an auxiliary battery that is charged through a buck operation of the buck converter; and an ECU that outputs a first target voltage and a second target voltage respectively to the buck converters. The buck converter is disposed inside the PCU, performs a buck operation so that a target voltage is generated, and outputs a stepped-down electric power to a power line. The buck converter is disposed outside the PCU, performs a buck operation so that a target voltage is generated, and outputs a stepped-down electric power to the power line. The ECU sets the target voltage higher than the target voltage when the ECU causes PCU to operate.

8 Claims, 9 Drawing Sheets

FIG.3 <ReadyON>

FIG.6 <PLUG-IN CHARGING>

VEHICLE AND VEHICLE CONTROL METHOD

CROSS REFERENCE TO RELATED APPLICATIONS

This nonprovisional application claims priority to Japanese Patent Application No. 2019-219550 filed on Dec. 4, 2019 with the Japan Patent Office, the entire content of which is hereby incorporated by reference.

BACKGROUND

Field

The present disclosure relates to a vehicle and a vehicle control method, and, more particularly, to a vehicle carrying an auxiliary battery and a method of control of the same.

Description of the Background Art

In general, an auxiliary battery is mounted on a vehicle. Electric power stored in the auxiliary battery gradually decreases. Thus, there is a need for charging the auxiliary battery appropriately. A configuration of a vehicle carrying multiple buck converters, can be employed.

Moreover, with growing awareness of the environment in recent years, a fuel cell vehicle (FCV), for example, as disclosed in WO 2011/004493, has been developed.

SUMMARY

Assume a configuration in which two buck converters are provided for charging an auxiliary battery. These buck converters are referred to a first buck converter and a second buck converter. It is also contemplated that the first buck converter and second buck converter are caused to perform buck operation simultaneously to charge an auxiliary battery. However, the inventor focused on the fact that an efficient situation can take place from the standpoint of energy consumption of the vehicle in a particular vehicle configuration (described below) with the use of one of the first buck converter and the second buck converter as a main buck converter and the other as a sub buck converter, rather than using both the first buck converter and the second buck converter to a comparable degree (without differentiating them as main/sub converters).

The present disclosure is made to solve the above problem, and an object of the present disclosure is to improve the energy utilization efficiency of a vehicle in a vehicle configuration capable of charging an auxiliary battery by either the first buck converter or the second buck converter.

(1) A vehicle according to a certain aspect of the present disclosure includes: a first buck converter; a second buck converter; an auxiliary battery that is charged with an electric power transmitted through a power line; a controller that outputs a first target voltage to the first buck converter and a second target voltage to the second buck converter; a cooling system; and equipment that is cooled by the cooling system. The first buck converter is disposed inside the equipment, performs a buck operation so that the first target voltage is generated, and outputs a stepped-down electric power to the power line. The second buck converter is disposed outside the equipment, performs a buck operation so that the second target voltage is generated, and outputs a stepped-down electric power to the power line. The controller sets the first target voltage higher than the second target voltage when the controller causes the equipment to operate.

(2) The vehicle further includes a traction motor. The equipment is a power converter that drives the traction motor.

(3) The vehicle further includes a power storage device. The equipment is a charger that charges the power storage device with an electric power supplied from outside the vehicle.

(4) When an output current from the first buck converter is less than a maximum output current of the first buck converter, the controller prevents the second buck converter from outputting a stepped-down electric power to the power line by setting the first target voltage higher than the second target voltage. When the output current from the first buck converter is greater than the maximum output current, the controller causes the first buck converter and the second buck converter to electric output a stepped-down power to the power line by setting the first target voltage higher than the second target voltage.

As will be described in greater detail below, if the first target voltage is set higher than the second target voltage, the buck operation of the second buck converter can be stopped while an output current from the first buck converter is within a range less than the maximum output current of the first buck converter. The first buck converter that is disposed inside the equipment (a power converter or a charger, etc.) cooled by the cooling system, is now used as a main buck converter. An energy loss (heat loss) at the buck operation of the first buck converter can be reduced by cooling the first buck converter along with cooling the equipment. Consequently, according to the configurations described in (1) through (4) above, energy utilization efficiency of the vehicle can be improved.

(5) The vehicle further includes another cooling system that cools the second buck converter. The controller deactivates the another cooling system when the output current from the first buck converter is less than the maximum output current of the first buck converter.

If the output current from the first buck converter is less than the maximum output current of the first buck converter, the second buck converter stops its operation. Consequently, according to the configuration described in (5) above, energy consumption of other cooling system cooling the second buck converter can be saved by stopping the other cooling system, thereby further improving the energy utilization efficiency of the vehicle.

(6) A vehicle according to other aspect of the present disclosure includes: a traction motor; a power converter that drives the traction motor; a power storage device; a charger that charges the power storage device with an electric power supplied from outside the vehicle; a first cooling system that cools the power converter; a second cooling system that cools the charger; a first buck converter; a second buck converter; a third buck converter; a fourth buck converter; an auxiliary battery charged through a buck operation of the first to fourth buck converters; and a controller that outputs the first to fourth target voltages to the first to fourth buck converters, respectively. The first buck converter performs the buck operation so that the first target voltage is generate, and outputs a stepped-down electric power to the first power line. The second buck converter performs the buck operation so that the second target voltage is generated, and outputs a stepped-down electric power to the first power line. The third buck converter performs the buck operation so that the third target voltage is generated, and outputs a stepped-down electric power to the second power line. The fourth buck converter performs the buck operation so that the fourth target voltage is generated, and outputs a stepped-down electric power to the second power line. The first buck converter is disposed inside the power converter. The second buck converter is disposed outside the power converter and the charger. The third buck converter is disposed inside the charger. The fourth buck converter is disposed inside the power converter. The controller sets the first target voltage higher than the second target voltage when the controller causes the power converter to operate, and sets the third target voltage higher than the fourth target voltage when the controller causes the charger to operate.

The first buck converter and the second buck converter are differentiated as a main buck converter and a sub buck converter, and the third buck converter and the fourth buck converter are differentiated as a main buck converter and a sub buck converter. According the configuration described in (6) above, as with the configuration described in (1) above, this can improve the energy utilization efficiency of the vehicle as appropriate, in response to the usage of the vehicle, such as a situation where the power converter is in operation or the charger is in operation.

(7) In a method of control of a vehicle according to other aspect of the present disclosure, the vehicle includes: a first buck converter; a second buck converter; an auxiliary battery that is charged with an electric power transmitted through a power line; and equipment that is cooled by a cooling system. The first buck converter performs a buck operation so that a first target voltage is generated, and outputs a stepped-down electric power to the power line. The second buck converter performs a buck operation so that the second target voltage is generated, and outputs a stepped-down electric power to the power line. The first buck converter is disposed inside the equipment. The second buck converter is disposed outside the equipment. The vehicle control method includes: determining whether to cause the equipment to operate; and setting the first target voltage higher than the second target voltage.

According to the method described in (7) above, as with the configuration described in (1) above, energy utilization efficiency of the vehicle can be improved.

The foregoing and other objects, features, aspects and advantages of the present disclosure will become more apparent from the following detailed description of the present disclosure when taken in conjunction with the accompanying drawings.

DETAILED DESCRIPTION

Hereinafter, embodiments will be described, with reference to the accompanying drawings. Note that like reference signs are used to refer to like or corresponding parts, and the description will not be repeated.

Embodiment 1

Figure 1:
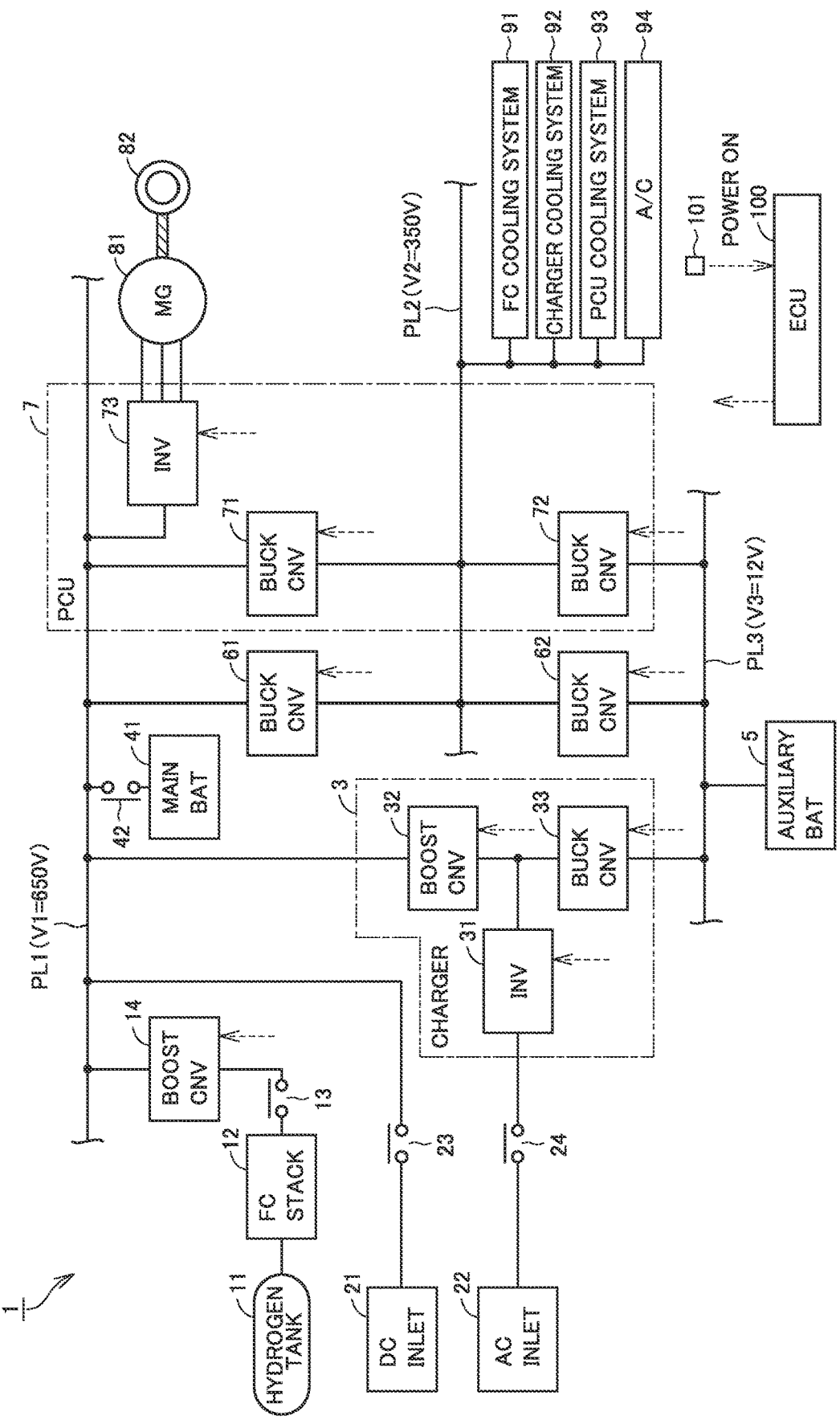
FIG. 1 is a circuit block diagram schematically showing an overall configuration of a vehicle according to Embodiment 1.

<Overall Configuration of Vehicle>
FIG. 1 is a circuit block diagram schematically showing an overall configuration of a vehicle according to Embodiment 1. Referring to FIG. 1, in the present embodiment, a vehicle 1 is a fuel cell vehicle. Vehicle 1 is also capable of external charging with electric power supplied from outside the vehicle 1 (so-called plug-in charging). In other words, vehicle 1 is a plug-in fuel cell vehicle (PFCV). However, the vehicle 1 is not limited to a PFCV or a fuel cell vehicle (FCV). Vehicle 1 may be a typical plug-in hybrid vehicle (PHV) which carries an engine, instead of a fuel cell.

Vehicle 1 includes a hydrogen tank 11, a fuel cell stack (FC stack) 12, a relay 13, a boost converter 14, a direct-current (DC) inlet 21, an alternating-current (AC) inlet 22, charge relays 23, 24, a charger 3, a main battery 41, a system main relay (SMR) 42, an auxiliary battery 5, buck converters 61, 62, a power control unit (PCU) 7, a motor generator 81, driving wheels 82, a fuel cell cooling system (FC cooling system) 91, a charger cooling system 92, a PCU cooling system 93, an air conditioning system 94, an electronic control unit (ECU) 100, and power lines PL1, PL2, and PL3. Charger 3 includes an inverter 31, a boost converter 32, and a buck converter 33. PCU 7 includes buck converters 71, 72 and an inverter 73.

Power lines PL1 to PL3 each transmit electric power at a given voltage level (a voltage within a predetermined voltage range). Voltage levels V1 to V3 of power lines PL1 to PL3 are in the listed order (V1>V2>V3). As one example, power line PL1 has voltage level V1=650V, power line PL2 has voltage level V2=350V, and power line PL3 has voltage level V3=12V.

Hydrogen tank 11 stores hydrogen. Although not shown, vehicle 1 further includes a supply inlet which receives supply of hydrogen from a hydrogen station.

FC stack 12 is a structure in which multiple (e.g., several tens to several hundreds of) FC cells are stacked in series. The hydrogen stored in hydrogen tank 11 is conveyed to the anode side of FC stack 12 by a hydrogen pump (not shown). An air is conveyed from an air pump (not shown) to the cathode side of FC stack 12. In this way, FC stack 12 causes hydrogen and oxygen in air to undergo an electrochemical reaction, thereby generating an electric power.

Relay 13 is electrically connected between FC stack 12 and boost converter 14. Relay 13 is opened/closed according to a control command from ECU 100.

According to a control command from ECU 100, boost converter 14 boosts the voltage of the electric power, generated by FC stack 12, to voltage level V1.

DC inlet 21 and AC inlet 22 are each capable of receiving a connector (not shown) of a charging cable extending from charging equipment, such as a charging station. DC inlet 21 is a charge inlet for so-called fast charging, which receives a high-voltage DC power supplied from a charging station. DC inlet 21 is electrically connected to power line PL1 via charge relay 23. AC inlet 22 is a charge inlet for so-called normal charging, which receives an AC power supplied from a charging station. AC inlet 22 is electrically connected to charger 3 via charge relay 24. Charge relays 23, 24 are opened/closed according to a control command from ECU 100.

Inverter 31 is electrically connected between AC inlet 22 and boost converter 32 and between AC inlet 22 and buck converter 33. According to a control command from ECU 100, inverter 31 converts the AC power, supplied via AC inlet 22 from the charging equipment, into a DC power, and outputs the DC power to boost converter 32 or buck converter 33.

Boost converter 32 is electrically connected between inverter 31 and power line PL1. According to a control command from ECU 100, boost converter 32 boosts the voltage of the DC power from inverter 31, and outputs the boosted DC power to power line PL1.

Buck converter 33 is electrically connected between inverter 31 and power line PL3. According a control command from ECU 100, buck converter 33 steps down the voltage of the DC power from inverter 31, and outputs the stepped-down DC power to power line PL3.

Main battery 41 is electrically connected to power line PL1 via SMR 42. Main battery 41 includes a battery pack formed of multiple cells (e.g., appropriately 200 cells). Each of the cells, included in the battery pack, is a secondary battery, such as a lithium-ion battery or a nickel-hydrogen battery. For example, main battery 41 supplies PCU 7 with an electric power for generating a driving force for vehicle 1, or stores a regenerated energy from PCU 7. Note that a capacitor, such as an electric double layer capacitor, may be employed, instead of main battery 41. The magnitude of output from main battery 41 is less than, for example, one-tenth the magnitude of output from FC stack 12. Main battery 41 is one example of "power storage device" according to the present disclosure.

SMR 42 is electrically connected between power line PL1 and main battery 41. According to a control command from ECU 100, SMR 42, for example, electrically connects main battery 41 to power line PL1 or electrically disconnects main battery 41 from power line PL1.

Auxiliary battery 5 is electrically connected to power line PL3. Auxiliary battery 5 is a secondary battery, for example, a lead storage battery. Auxiliary battery 5 supplies electric power for causing various auxiliary machinery (not shown) included in vehicle 1 to operate.

Buck converter 61 is disposed outside the PCU 7, and electrically connected between power line PL1 and power line PL2. According a control command from ECU 100, buck converter 61 steps down the electric power, transmitted through power line PL1, from voltage level V1 to voltage level V2, and outputs the stepped-down electric power to power line PL2.

Buck converter 62 is disposed outside the PCU 7, and electrically connected between power line PL2 and power line PL3. According to a control command from ECU 100, buck converter 62 steps down the electric power, transmitting through power line PL2, from voltage level V2 to voltage level V3, and outputs the stepped-down electric power to power line PL3.

Buck converter 71 is disposed inside the PCU 7, and electrically connected between power line PL1 and power line PL2. According to a control command from ECU 100, buck converter 71 steps down the electric power, transmitting through power line PL1, from voltage level V1 to voltage level V2, and outputs the stepped-down electric power to power line PL2.

Buck converter 72 is disposed inside the PCU 7, and electrically connected between power line PL2 and power line PL3. According to a control command from ECU 100, buck converter 72 steps down the electric power, transmitting through power line PL2, from voltage level V2 to voltage level V3, and outputs the stepped-down electric power to power line PL3.

Inverter 73 is electrically connected between power line PL1 and motor generator 81. According to a control command from ECU 100, inverter 73 converts the DC power, transmitting through power line PL1, into an AC power, and outputs the AC power to motor generator 81. Note that a bidirectional DC-to-DC converter may be disposed between power line PL1 and inverter 73.

Motor generator 81 is an AC rotating electric machine, for example, a three-phase AC synchronous motor which includes a rotor having a permanent magnet embedded therein. Motor generator 81 operates with supply of the AC power from inverter 73, and drives driving wheels 82. Note that motor generator 81 is one example of "traction motor" according to the present disclosure.

FC cooling system 91, charger cooling system 92, and PCU cooling system 93 are electrically connected to power line PL2. FC cooling system 91 cools FC stack 12, according to a control command from ECU 100. Charger cooling system 92 cools charger 3, according to a control command from ECU 100. PCU cooling system 93 cools PCU 7, according to a control command from ECU 100.

Air conditioning system 94 is electrically connected to power line PL2. Air conditioning system 94 performs air conditioning in the vehicle compartment, according to a control command from ECU 100.

ECU 100 includes a processor, such as a central processing unit (CPU), a memory, such as a read only memory (ROM) and a random access memory (RAM), and input/output ports (none of which are shown). In response to signals from sensors, ECU 100 outputs various control commands to control the devices so that vehicle 1 is brought into a desired state. ECU 100 may be divided into multiple units by function. In the present embodiment, examples of the main control performed by ECU 100 include a charging control over auxiliary battery 5. In vehicle 1, three electric power transmission paths are prepared for charging auxiliary battery 5.

A first power transmission path runs through power line PL1, buck converter 61, power line PL2, buck converter 62 to power line PL3. The first power transmission path is primarily used for plug-in charging through DC inlet 21. A configuration without buck converters 61, 62 is also contemplated. In that case, however, in order to charge the auxiliary battery 5 by the plug-in charging through DC inlet 21, PCU 7 has to be turned on to cause buck converters 71, 72 to operate. Providing buck converters 61, 62 allows the plug-in charging through DC inlet 21, without turning on the PCU 7.

A second power transmission path runs through power line PL1, buck converter 71, power line PL2, buck converter 72 to power line PL3. The second power transmission path is primarily used when vehicle 1 is in a ReadyON state (described later).

A third power transmission path runs through AC inlet 22, inverter 31, and buck converter 33 to power line PL3. The third power transmission path is primarily used for plug-in charging through AC inlet 22.

Vehicle 1 further includes a power switch 101. Power switch 101 receives a user's system startup operation and system shutdown operation of vehicle 1. As the user performs the system startup operation, while pressing the brake pedal, a power-on signal is output from a power switch 101 to ECU 100. Upon receipt of the power-on signal, ECU 100 causes vehicle 1 to transition from a system shutdown state (ReadyOFF state) to a system startup state (ReadyON state). More specifically, ECU 100 switches SMR 42 from an opened state to a closed state in response to the power-on signal to allow exchange of electric power between main battery 41 and PCU 7. Furthermore, ECU 100 performs a system initialization process (such as a self check) of vehicle 1 to make sure that the system is ready to be started up. This causes vehicle 1 to transition to be ready for travel using the driving force of motor generator 81.

<Configuration of Buck Converter>

Vehicle 1 includes five buck converters 33, 61, 62, 71, 72. Buck converters 33, 61, 62, 71, 72 basically have a common circuit structure. Thus, in the following, the circuit structure of buck converter 61 will be described representatively.

Figure 2:
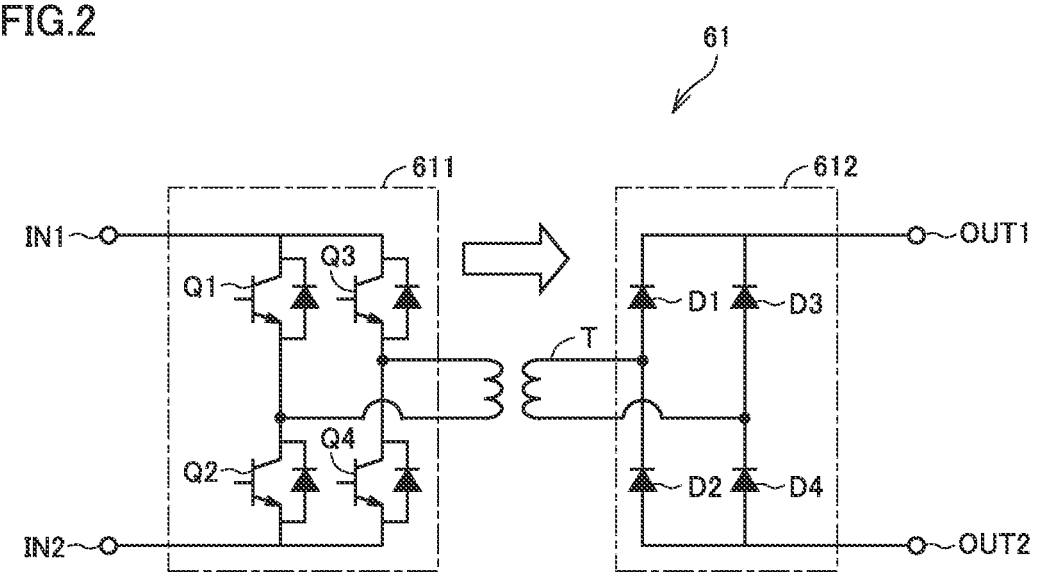
FIG. 2 is a diagram showing one example circuit structure of a buck converter.

FIG. 2 is a diagram showing one example circuit structure of buck converter 61. Referring to FIG. 2, buck converter 61 includes input nodes IN1, IN2, a DC-to-AC conversion unit 611, a transformer T, a rectifier unit 612, and output nodes OUT1, OUT2.

DC-to-AC conversion unit 611 is, for example, a typical inverter, and includes four switching elements Q1 to Q4. Switching elements Q1 to Q4 are each an insulated gate bipolar transistor (IGBT) or a power MOSFET (Metal-Oxide-Semiconductor Field-Effect Transistor), for example. Switching element Q1 and switching element Q2 are connected in series between input node IN1 and input node IN2. Similarly, switching element Q3 and switching element Q4 are connected in series between input node IN1 and input node IN2.

For example, rectifier unit 612 is a diode bridge which includes four diodes D1 to D4. Diode D1 and diode D2 are connected in series between output node OUT1 and output node OUT2 in the forward direction from output node OUT2 to output node OUT1. Similarly, diode D3 and diode D4 are connected in series between output node OUT1 and output node OUT2 in the forward direction from output node OUT2 to output node OUT1.

Transformer T has an input electrically connected to a midpoint between switching element Q1 and switching element Q2, and a midpoint between switching element Q3 and switching element Q4. Transformer T has an output electrically connected to the point of connection of the anode of diode D1 and the cathode of diode D2, and the point of connection of the anode of diode D3 and the cathode of diode D4.

In DC-to-AC conversion unit 611, switching element Q1 and switching element Q4 in a pair perform a switching operation, and switching element Q2 and switching element Q3 in a pair perform a switching operation. The DC power input to DC-to-AC conversion unit 611 now turns to be a square wave AC power whose positive and negative reverse for each switching operation, and the square wave AC power is output to transformer T. Transformer T transforms (steps down) the voltage of the AC power from DC-to-AC conversion unit 611, and outputs to rectifier unit 612 an AC power having the transformed voltage. Rectifier unit 612 rectifies the AC power from transformer T and converts it into a DC power.

In buck converter 61 having such a circuit structure, the commutations of diodes D1 to D4 included in rectifier unit 612 limit the direction of power conversion to the single direction indicated by the arrow in the figure. Electric power cannot be supplied from output nodes OUT1, OUT2 to input nodes IN1, IN2.

<Auxiliary Battery Charging Control>

In the present embodiment, a charging control is performed on auxiliary battery 5, in accordance with an operation status of vehicle 1. More specifically, the charging control over auxiliary battery 5 differs between when vehicle 1 is in a state ready for travel (ReadyON state) and when vehicle 1 is not (e.g., vehicle 1 is not ready to travel since vehicle 1 is performing plug-in charging). In Embodiment 1, a charging control over auxiliary battery 5 when vehicle 1 is in a ReadyON state is now described.

Figure 3:
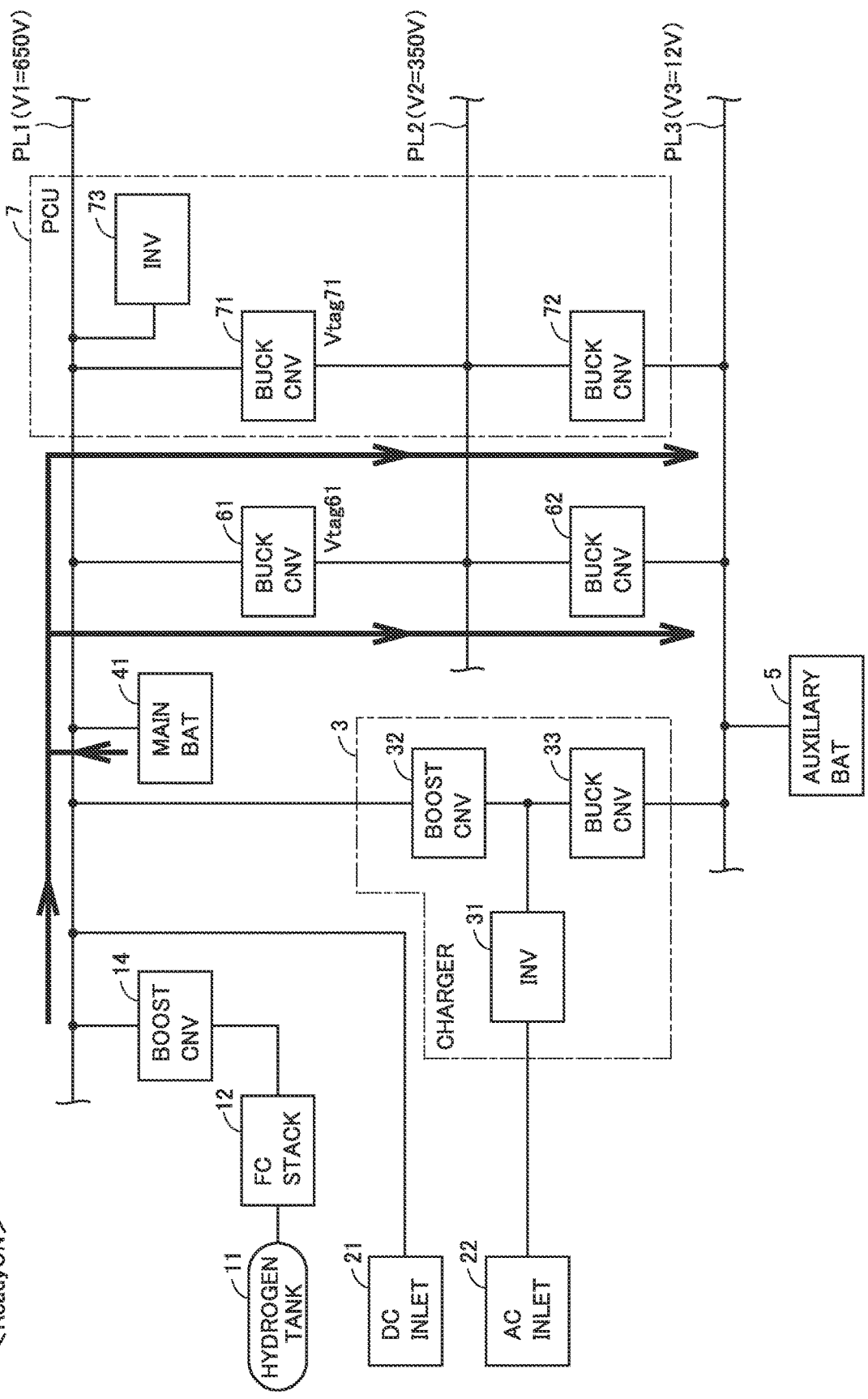
FIG. 3 is a diagram for illustrating a charging control over an auxiliary battery when the vehicle is in a ReadyON state.

FIG. 3 is a diagram for illustrating a charging control over auxiliary battery 5 when vehicle 1 is in a ReadyON state. Note that, for the sake of brevity, some components (various relays and cooling systems) of vehicle 1 are omitted from FIG. 3 and FIG. 6 described below.

Referring to FIG. 3, assume a situation in which a charging cable is not inserted in DC inlet 21 and AC inlet 22 of vehicle 1 and vehicle 1 has transitioned to ReadyON state as a power-on operation is performed by a user.

When vehicle 1 is in a ReadyON state, at least one of the electric power generated by FC stack 12 and the electric power stored in main battery 41 is transmitted to power line PL1. When charging the auxiliary battery 5, this electric power can pass through two electric power transmission paths (the first and second power transmission paths) to reach power line PL3. As mentioned above, the first power transmission path runs through buck converters 61, 62 disposed outside the PCU 7. The second power transmission path runs through buck converters 71, 72 disposed inside the PCU 7.

If a load (FC cooling system 91, PCU cooling system 93, or air conditioning system 94) connected to power line PL2 is in operation, consuming a large electric power, and only one of the first and second power transmission paths is used, a lack of supply of electric power to power line PL2 may result. Therefore, both the first and second power transmission paths are used.

In this case, it may also be contemplated that the first power transmission path (buck converter 61) and the second power transmission path (buck converter 71) are used, without specifically being differentiated from each other. However, as a result of considerations, the inventor found that it is desirable that buck converter 61 and buck converter 71 should be differentiated as a main buck converter and a sub buck converter from the standpoint of the energy saving of vehicle 1 and/or the controllability of vehicle 1.

When vehicle 1 is in a ReadyON state, PCU 7 (more specifically, inverter 73) is in operation because vehicle 1 is traveling, or even if vehicle 1 is not actually traveling, PCU 7 is activated in preparation for traveling of vehicle 1. PCU 7 can also be cooled by PCU cooling system 93, as needed. Therefore, similarly to inverter 73, buck converter 61 disposed inside the PCU 7 is ready for operation and can be cooled as appropriate. In contrast, buck converter 71 disposed outside the PCU 7 is originally provided so that auxiliary battery 5 can be charged even when PCU 7 is deactivated, as described with respect to FIG. 1. As such, buck converter 61 and buck converter 71 have different installation purposes, and, the originally expected usage scenarios of the two are accordingly different.

Thus, in the present embodiment, when vehicle 1 is in a ReadyON state and PCU 7 is in operation, buck converter 71 inside the PCU 7 overrides buck converter 61 outside the PCU 7. Stated differently, when vehicle 1 is in a ReadyON state, buck converter 71 is used as a main buck converter, and buck converter 61 is used as a sub buck converter. Specifically, buck converter 71 and buck converter 61 can be differentiated as a main buck converter and a sub buck converter by setting the target voltage of buck converter 71 to a value higher than the target voltage of buck converter 61. In the following, the target voltage of buck converter 61 will be described as Vtag61. The target voltage of buck converter 71 will be described as Vtag71.

Figure 4:
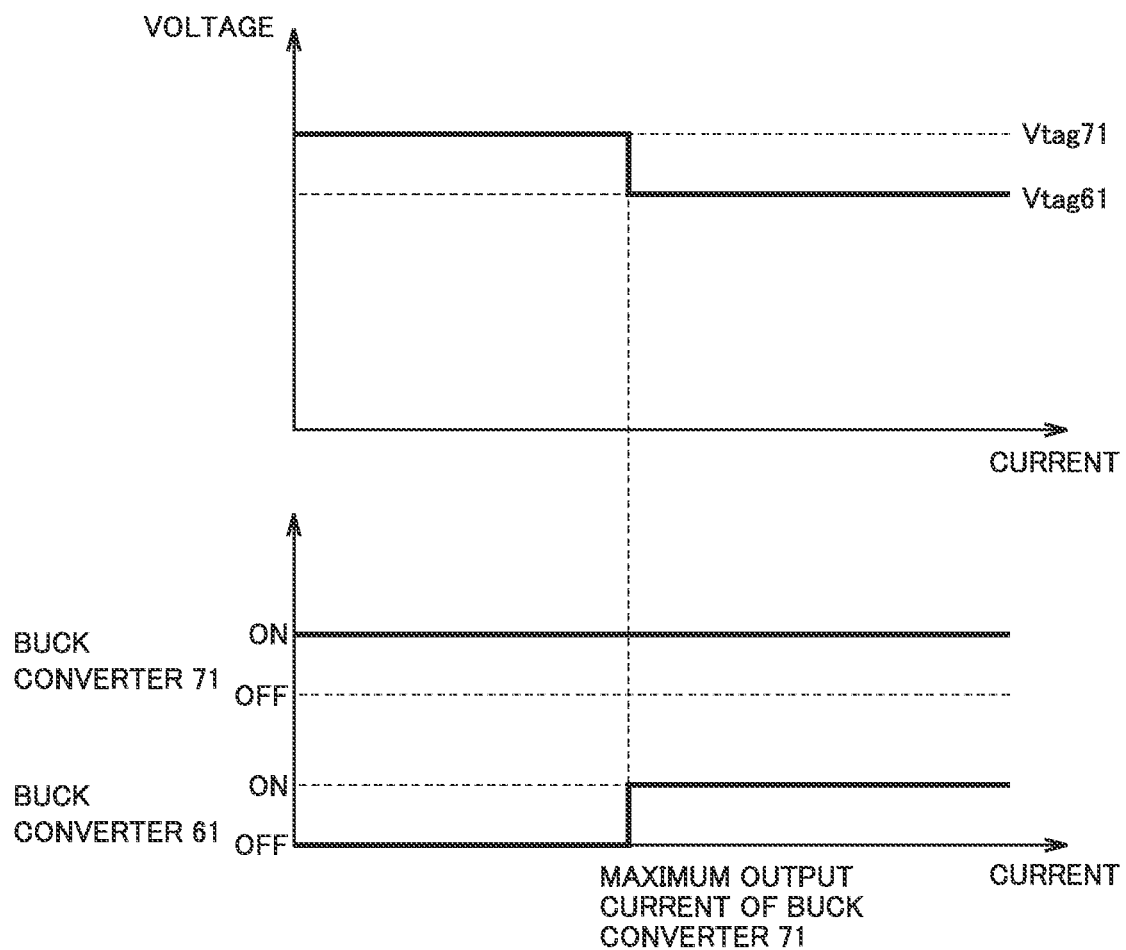
FIG. 4 is a diagram for illustrating effects of target voltages in Embodiment 1.

FIG. 4 is a diagram for illustrating effects of the target voltages in Embodiment 1. In FIG. 4, a load current flow from buck converters 61, 71 to power line PL2 is represented on the horizontal axis. An output voltage from buck converters 61, 71 to power line PL2 is represented on the vertical axis.

In general, a current that can be output from a buck converter has a maximum value (e.g., a rated current value) depending of the specifications of the buck converter. This current is referred to as "maximum output current." If target voltage Vtag61 of buck converter 61 and target voltage Vtag71 of buck converter 71 are different and target voltage Vtag71 is higher than target voltage Vtag61 (Vtag71>Vtag61), the load current to power line PL2 is in a range less than or equal to the maximum output current of buck converter 71, as shown in FIG. 4, an electric power stepped down to target voltage Vtag71 is output only from buck converter 71 whose target voltage Vtag71 is higher than target voltage Vtag61 of buck converter 61. During this time, while the switching operation of switching elements Q1 to Q4 (see FIG. 2) included in buck converter 61, whose target voltage Vtag61 is lower than target voltage Vtag71 of buck converter 71, continues, a stepped-down electric power (an electric power having voltage Vtag61) is not output from buck converter 61.

The electric power output of buck converter 61 is stopped for the following reason. When buck converter 71 outputs an electric power stepped down to target voltage Vtag71, the output side of buck converter 71 and the output side of buck converter 61 are in equipotential, and thus the voltage on the output side of buck converter 61 is Vtag71 too. However, due to the rectification of diodes D1 to D4, buck converter 61 is only allowed to perform a single direction power conversion operation (buck operation), and cannot output an electric power with voltage Vtag61 that is lower than voltage Vtag71. Thus, buck converter 61 does not output electric power as long as the output current of buck converter 71 is sufficient.

However, if the output current of buck converter 71 exceeds the maximum output current of buck converter 71, a current above the maximum output current cannot be output from buck converter 71. Electric power is output from buck converter 61, in addition to from buck converter 61. An output voltage from buck converter 71 already operating at its limit follows the output voltage from buck converter 61. Buck converters 61, 71 then perform the buck operation at lower target voltage Vtag61 than Vtag71.

As such, in the present embodiment, target voltage Vtag71 of buck converter 71 is set higher than target voltage Vtag61 of buck converter 61. This can cause only buck converter 71 to output electric power and stop the electric power output from buck converter 61 when only buck converter 71 is capable of supply the current consumed by the load connected to power line PL2. Furthermore, as buck converter 71 can no longer supply necessary current, buck converter 61 compensates for the current deficit, thereby meeting the current demand.

<Charging Control Procedure>

Figure 5:
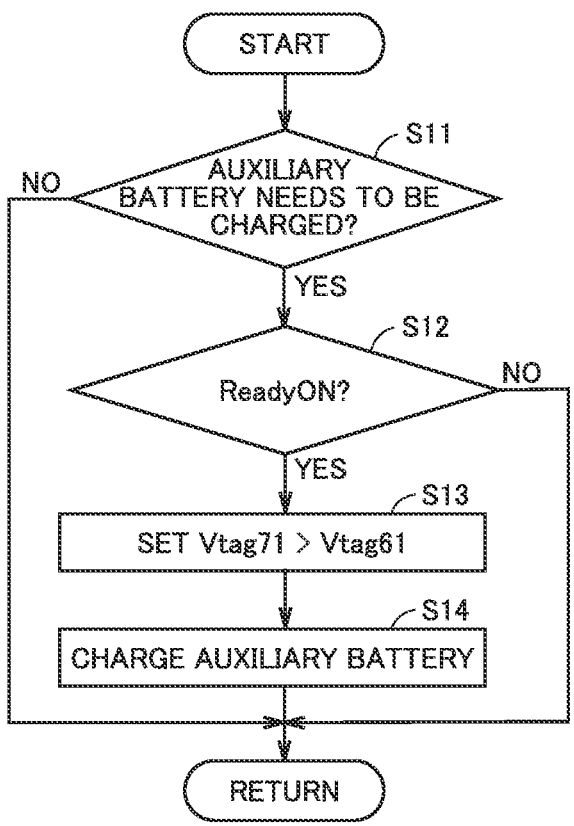
FIG. 5 is a flowchart showing the charging control over the auxiliary battery in Embodiment 1.

FIG. 5 is a flowchart showing a charging control over auxiliary battery 5 in Embodiment 1. The flowcharts shown in FIG. 5 and FIGS. 8 and 9, described below, are performed, for example, each time predetermined conditions are met or each time a control cycle elapses. Each of the steps included in these flowcharts is basically implemented by software processing by ECU 100, but may be implemented by dedicated hardware (an electric circuit) fabricated within ECU 100. Hereinafter, steps are abbreviated as "S."

Referring to FIG. 5, at S11, ECU 100 determines whether auxiliary battery 5 needs to be charged. For example, when the voltage of auxiliary battery 5 is below a specified voltage, indicating that the state of charge (SOC) of auxiliary battery 5 is reduced, ECU 100 determines that auxiliary battery 5 needs to be charged. Alternatively, ECU 100 may determine that auxiliary battery 5 needs to be charged each time a given time elapses (i.e., periodically). If auxiliary battery 5 does not need to be charged (NO in S11), the process returns to the main routine.

If auxiliary battery 5 needs to be charged (YES in S11), ECU 100 proceeds to S12 and determines whether vehicle 1 is in a ReadyON state. If vehicle 1 is in a ReadyON state (YES in S12), ECU 100 sets target voltage Vtag71 of buck converter 71 higher than target voltage Vtag61 of buck converter 61 (Vtag71>Vtag61) (S13). ECU 100 then controls buck converters 61, 62, 71, 72 so that charging of auxiliary battery 5 starts (S14).

Note that in Embodiment 1, if vehicle 1 is not in a ReadyON state (NO in S12), that is, if vehicle 1 is in a ReadyOFF state, the process returns to the main routine. In this case, ECU 100 may set target voltage Vtag61 and target voltage Vtag71 to be equal and charge auxiliary battery 5, in accordance with a flowchart not shown (Vtag61=Vtag71).

As described above, in Embodiment 1, when vehicle 1 is in a ReadyON state, ECU 100 sets the target voltage of buck converter 71 disposed inside the PCU 7 to a value higher than the target voltage of buck converter 61 disposed outside the PCU 7. This can cause only buck converter 71 to output electric power and stop output of electric power from buck converter 61, as long as buck converter 71 does not exceed the current supply capability of buck converter 71.

When vehicle 1 is in a ReadyON state, PCU 7 is already activated, and thus a situation would not occur in which PCU 7 is activated for the purposes of charging the auxiliary battery 5. Thus, reduction in controllability of vehicle 1 can be avoided. Furthermore, when vehicle 1 is in a ReadyON state, PCU 7 is also cooled as needed, and thus an energy loss (heat loss) caused at buck converter 71 can also be reduced. Accordingly, the energy efficiency in vehicle 1 can be improved.

Note that in Embodiment 1, PCU 7 corresponds to "equipment" according to the present disclosure, and PCU cooling system 93 corresponds to "cooling system" according to the present disclosure. Moreover, buck converter 71 and buck converter 61 respectively correspond to "first buck converter" and "second buck converter" according to the present disclosure. Power line PL2 corresponds to "power line" according to the present disclosure. While auxiliary battery 5 is charged with an electric power that is transmitted from power line PL2 to power line PL3 via buck converters 62, 72, it should be noted that even in such a charge mode, it can be said that "auxiliary battery 5 is charged with electric power transmitted through power line PL2."

Embodiment 2

Embodiment 1 has been described with reference to the charging control over auxiliary battery 5 when vehicle 1 is in a ReadyON state. Embodiment 2 will be described with reference to a charging control over an auxiliary battery 5 when a vehicle 1 is performing plug-in charging. Note that vehicle 1 according to Embodiment 2 has the same configuration (see FIG. 1) as vehicle 1 according to Embodiment 1.

Figure 6:
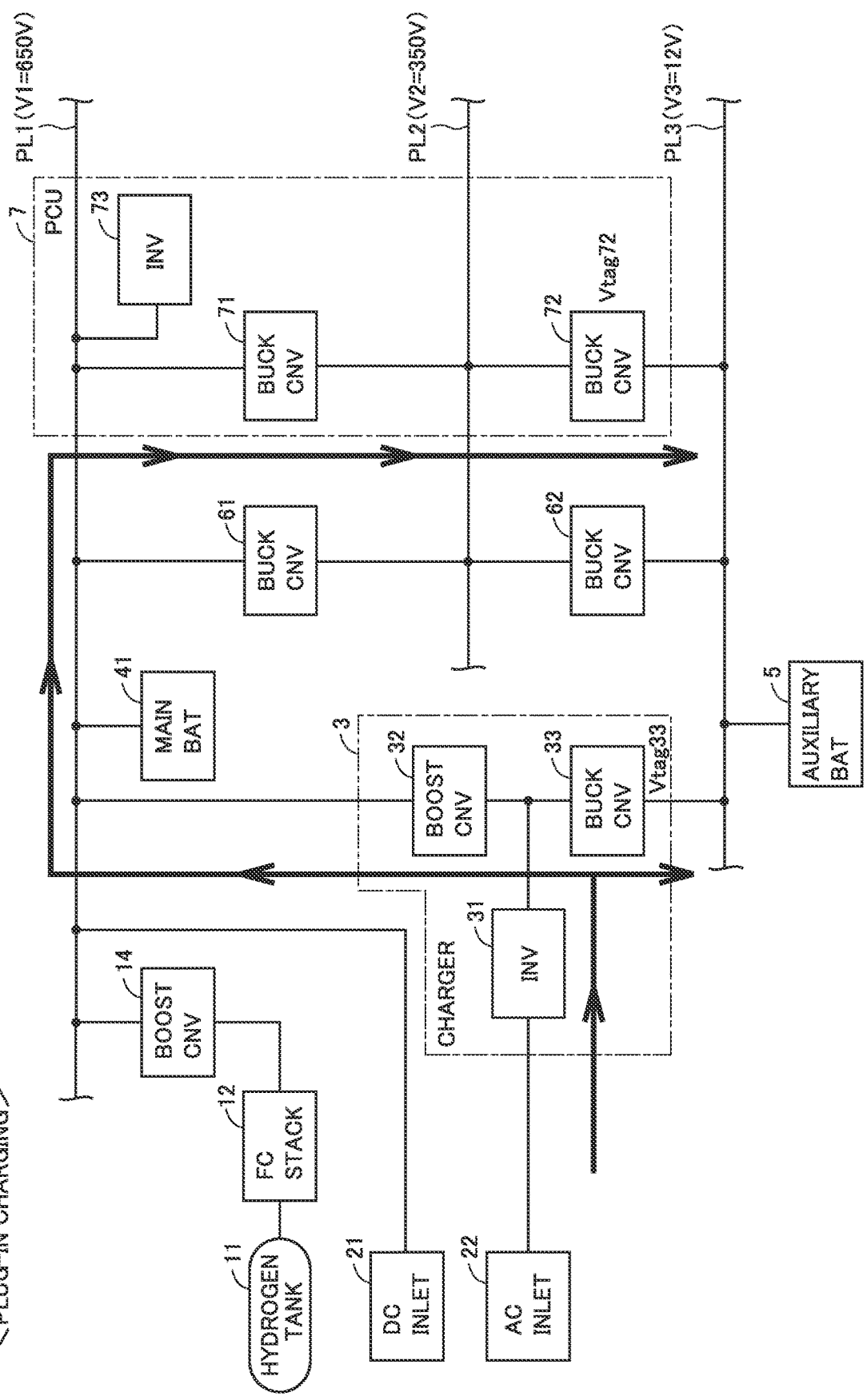
FIG. 6 is a diagram for illustrating a charging control over the auxiliary battery when the vehicle is performing plug-in charging.

FIG. 6 is a diagram for illustrating a charging control over auxiliary battery 5 when vehicle 1 is performing plug-in charging. Referring to FIG. 6, assume a situation in which a charging cable (not shown) is inserted in an AC inlet 22 and an AC power can be supplied from charging equipment via AC inlet 22.

Two electric power supply paths, specifically, the second power transmission path and the third power transmission path, mentioned above, are prepared also when vehicle 1 is performing plug-in charging. The second power transmission path runs through buck converters 71, 72 disposed inside a PCU 7. The third power transmission path runs through an inverter 31 and a buck converter 33 disposed inside a charger 3. In Embodiment 2, a target voltage Vtag33 of buck converter 33 is set higher than a target voltage Vtag72 of buck converter 72 (Vtag33>Vtag72) so that the third power transmission path (buck converter 33) is a main path and the second power transmission path (buck converter 72) is a sub path.

Figure 7:
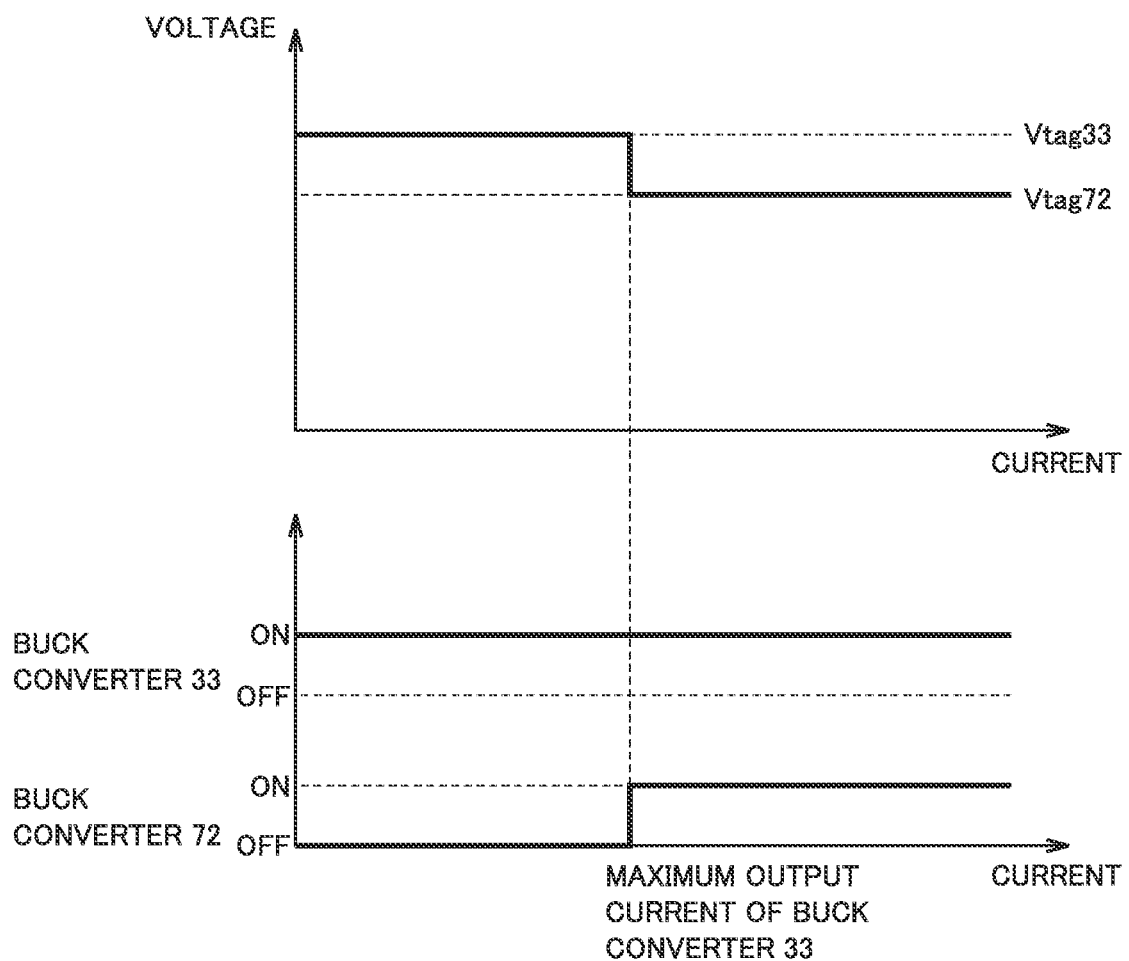
FIG. 7 is a diagram for illustrating effects of target voltages in Embodiment 2.

FIG. 7 is a diagram for illustrating effects of the target voltages in Embodiment 2. In FIG. 7, a load current flowing from buck converters 33, 72 to a power line PL3 is represented on the horizontal axis. Output voltages of buck converters 33, 72 (a charging voltage of auxiliary battery 5) are represented on the vertical axis.

Referring to FIG. 7, if target voltage Vtag33 is higher than target voltage Vtag72, only buck converter 33, whose target voltage Vtag33 is higher than Vtag72, performs a buck operation at target voltage Vtag33 and outputs an electric power, until the load current reaches a maximum output current of buck converter 33. During this time, buck converter 72, whose target voltage Vtag72 is lower than Vtag33, has stopped outputting an electric power while continuing the switching operation. After the output current from buck converter 33 reaches the maximum output current of buck converter 33, both buck converters 33, 72 output an electric power having target voltage Vtag72 lower than Vtag33.

Figure 8:
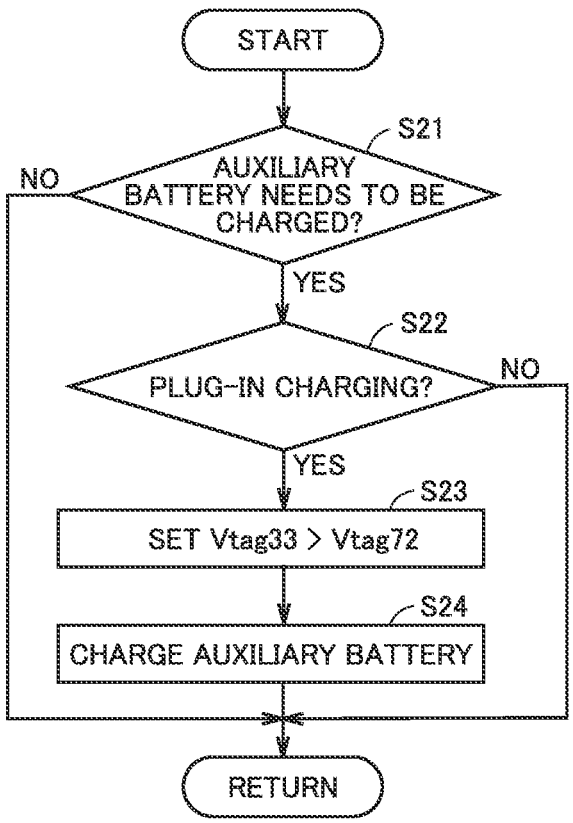
FIG. 8 is a flowchart showing a charging control over an auxiliary battery in Embodiment 2.

FIG. 8 is a flowchart showing a charging control over auxiliary battery 5 in Embodiment 2. Referring to FIG. 8, in S21, ECU 100 determines whether auxiliary battery 5 needs to be charged. If auxiliary battery 5 needs to be charged (YES in S21), ECU 100 proceeds to S22.

In S22, ECU 100 determines whether vehicle 1 is performing plug-in charging. ECU 100 can determine that vehicle 1 is performing plug-in charging if a charging cable is inserted in AC inlet 22 and a voltage sensor or a current sensor (not shown), provided in charger 3, detects that vehicle 1 is receiving supply of power from outside the vehicle 1. Alternatively, before vehicle 1 actually receives supply of power, vehicle 1 may be determined to be performing plug-in charging once vehicle 1 is ready to receive supply of power through communications with charging equipment via the charging cable. Note that in the present embodiment, the plug-in charging in S22 does not encompass fast charging via a DC inlet 21.

If vehicle 1 is performing plug-in charging (YES in S22), ECU 100 sets target voltage Vtag33 of buck converter 33 higher than target voltage Vtag72 of buck converter 72 (Vtag33>Vtag72) (S23). ECU 100 then controls boost converter 32 and buck converters 33, 71, 72 so that charging of auxiliary battery 5 starts (S24).

As described above, in Embodiment 2, when vehicle 1 is performing plug-in charging (including vehicle 1 being ready for plug-in charging), ECU 100 sets the target voltage of buck converter 33 disposed inside the charger 3 to a value higher than the target voltage of buck converter 72 disposed outside the charger 3 (inside the PCU 7 in this example). This can cause only buck converter 33 to output electric power and stop output of electric power from buck converter 72 (and buck converter 71), as long as buck converter 33 does not exceed the current supply capability of buck converter 33.

When vehicle 1 is performing plug-in charging, charger 3 is cooled by charger cooling system 92. Thus, an energy loss (heat loss) caused at buck converter 33 can be reduced. Moreover, since PCU cooling system 93 is not required to be activated until buck converters 71, 72 are activated, the power consumption of PCU cooling system 93 can be reduced. Accordingly, the energy efficiency in vehicle 1 can be improved.

Note that in Embodiment 2, charger 3 corresponds to "equipment" according to the present disclosure, and charger cooling system 92 corresponds to "cooling system" according to the present disclosure. Moreover, buck converter 33 and buck converter 72 respectively correspond to "first buck converter" and "second buck converter" according to the present disclosure, provided that "second buck converter" according to the present disclosure may be buck converter 62. Power line PL3 corresponds to "power line" according to the present disclosure.

[Variation]

The charging control over auxiliary battery 5 described in Embodiment 1 and the charging control over auxiliary battery 5 described in Embodiment 2 may be combined.

Figure 9:
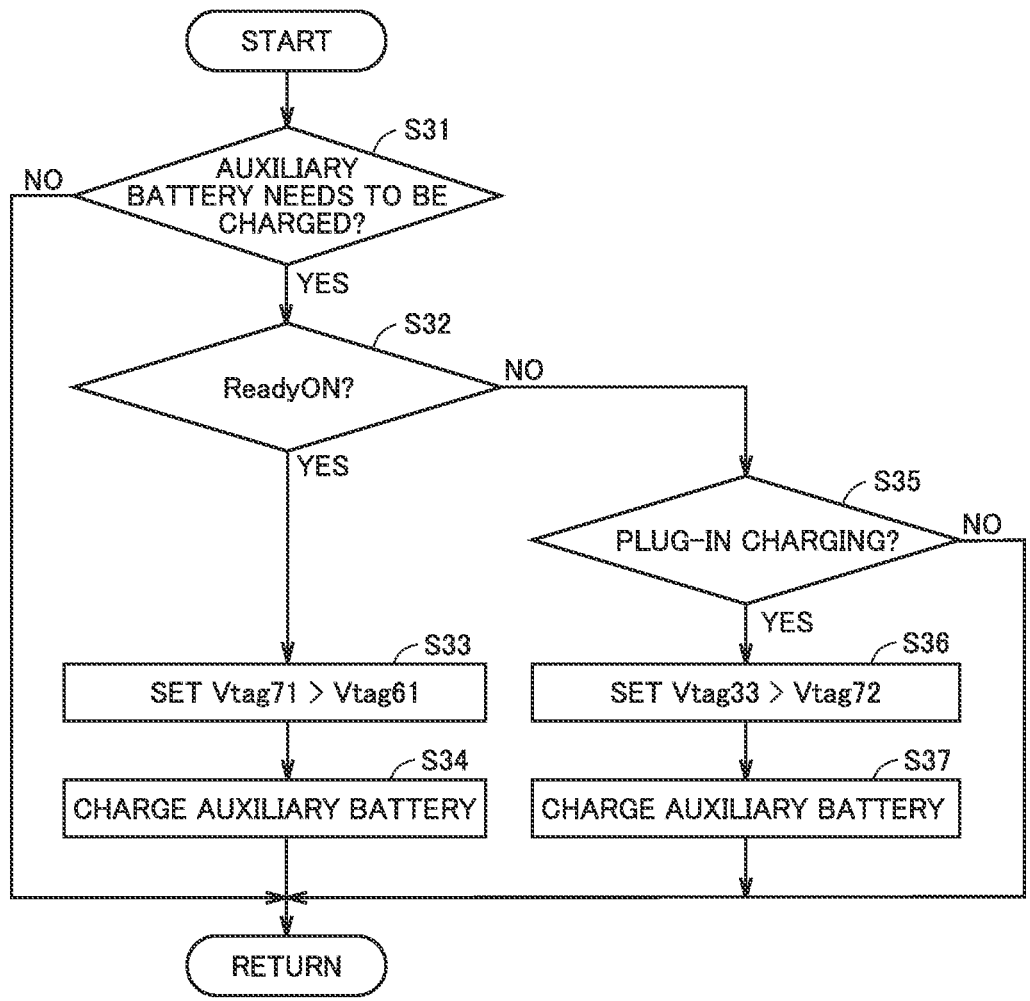
FIG. 9 is a flowchart showing a charging control over an auxiliary battery in Variation.

FIG. 9 is a flowchart showing a charging control over auxiliary battery 5 according to Variation. Referring to FIG. 9, in S31, ECU 100 determines whether auxiliary battery 5 needs to be charged.

If auxiliary battery 5 needs to be charged (YES in S31), ECU 100 determines whether vehicle 1 is in a ReadyON state (S32). If vehicle 1 is in a ReadyON state (YES in S32), ECU 100 sets target voltage Vtag71 of buck converter 71 higher than target voltage Vtag61 of buck converter 61 (Vtag71>Vtag61) (S33). Furthermore, ECU 100 controls buck converters 61, 62, 71, 72 so that charging of auxiliary battery 5 starts (S34).

If vehicle 1 is not in a ReadyON state (NO in S32), ECU 100 determines whether vehicle 1 is performing plug-in charging (S35). If vehicle 1 is performing plug-in charging (YES in S35), ECU 100 sets target voltage Vtag33 of buck converter 33 higher than target voltage Vtag72 of buck converter 72 (Vtag33>Vtag72) (S36). ECU 100 then controls boost converter 32 and buck converters 33, 71, 72 so that charging of auxiliary battery 5 starts (S37).

Similarly to Embodiments 1, 2, in Variation, the buck converters that are used to charge auxiliary battery 5 are differentiated as a main buck converter and a sub buck converter, depending on the usage of vehicle 1. This limits the cooling system to be operated, thereby improving the energy efficiency in vehicle 1.

Note that in Variation, PCU cooling system 93 corresponds to "first cooling system" according to the present disclosure, and charger cooling system 92 corresponds to "second cooling system" according to the present disclosure. Moreover, buck converter 71, buck converter 61, buck converter 33, and buck converter 72 respectively correspond to "first buck converter," "second buck converter," "third buck converter," and "fourth buck converter" according to the present disclosure. Power line PL2 corresponds to "first power line" according to the present disclosure, and power line PL3 corresponds to "second power line" according to the present disclosure.

Embodiments 1, 2 and Variation have been described with reference to vehicle 1 capable of plug-in charging (contact charging). However, vehicle 1 may be capable of non-contact charging in which an electric power is transmitted contactlessly from a power transmission apparatus provided outside the vehicle 1 to a power receiver apparatus mounted in vehicle 1.

Although the present disclosure has been described and illustrated in detail, it is clearly understood that the same is by way of illustration and example only and is not to be taken by way of limitation, the scope of the present disclosure being interpreted by the terms of the appended claims.

What is claimed is:

1. A vehicle, comprising:
a first buck converter that performs a buck operation so that a first target voltage is generated, and outputs a stepped-down electric power to a power line;
a second buck converter that performs a buck operation so that a second target voltage is generated, and outputs a stepped-down electric power to the power line;
an auxiliary battery that is charged with an electric power transmitted through the power line;
a controller that outputs the first target voltage to the first buck converter and the second target voltage to the second buck converter;
a cooling system; and
equipment that is cooled by the cooling system, wherein
the first buck converter is disposed inside the equipment,
the second buck converter is disposed outside the equipment, and
the controller sets the first target voltage higher than the second target voltage when the controller causes the equipment to operate,
when an output current from the first buck converter is less than a maximum output current of the first buck converter, the controller prevents the second buck converter from outputting a stepped-down electric power to the power line by setting the first target voltage higher than the second target voltage, and
when the output current from the first buck converter is greater than the maximum output current, the controller causes the first buck converter and the second buck converter to output a stepped-down electric power to the power line by setting the first target voltage higher than the second target voltage.

2. The vehicle according to claim 1, further comprising a traction motor, wherein
the equipment is a power converter that drives the traction motor.

3. The vehicle according to claim 1, further comprising a power storage device, wherein
the equipment is a charger that charges the power storage device with an electric power supplied from outside the vehicle.

4. The vehicle according to claim 1, further comprising another cooling system that cools the second buck converter, wherein
the controller deactivates the another cooling system when the output current from the first buck converter is less than the maximum output current.

5. A method of control of a vehicle,
the vehicle including:
a first buck converter that performs a buck operation so that a first target voltage is generated, and outputs a stepped-down electric power to a power line;
a second buck converter that performs a buck operation so that a second target voltage is generated, and outputs a stepped-down electric power to the power line;
an auxiliary battery that is charged with an electric power transmitted through the power line;
a cooling system; and
equipment that is cooled by the cooling system, wherein
the first buck converter is disposed inside the equipment, and
the second buck converter is disposed outside the equipment,
the method, comprising:
determining whether to cause the equipment to operate; and
setting the first target voltage higher than the second target voltage when the equipment is caused to operate
when an output current from the first buck converter is less than a maximum output current of the first buck converter, the controller prevents the second buck converter from outputting a stepped-down electric power to the power line by setting the first target voltage higher than the second target voltage, and
when the output current from the first buck converter is greater than the maximum output current, the controller causes the first buck converter and the second buck converter to output a stepped-down electric power to the power line by setting the first target voltage higher than the second target voltage.

6. The method of control of the vehicle of claim 5, wherein the vehicle further includes:
a traction motor, wherein
the equipment is a power converter that drives the traction motor.

7. The method of control of the vehicle of claim 5, wherein the vehicle further includes:
a power storage device, wherein
the equipment is a charger that charges the power storage device with an electric power supplied from outside the vehicle.

8. The method of control of the vehicle of claim 5, wherein the vehicle further includes:
another cooling system that cools the second buck converter, wherein
the another cooling system is deactivated when the output current from the first buck converter is less than the maximum output current.

* * * * *